(12) United States Patent
Muramoto

(10) Patent No.: US 7,545,532 B2
(45) Date of Patent: Jun. 9, 2009

(54) IMAGE PROCESSING APPARATUS AND IMAGE PROCESSING PROGRAM STORAGE MEDIUM

(75) Inventor: Yasuhiko Muramoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 850 days.

(21) Appl. No.: 10/158,005

(22) Filed: May 31, 2002

(65) Prior Publication Data

US 2002/0186389 A1 Dec. 12, 2002

(30) Foreign Application Priority Data

Jun. 7, 2001 (JP) ............................. 2001-172881
Jul. 24, 2001 (JP) ............................. 2001-223137

(51) Int. Cl.
*H04N 1/60* (2006.01)
*G06F 15/00* (2006.01)

(52) U.S. Cl. ........................................ 358/1.9; 358/518

(58) Field of Classification Search .................. 358/1.9, 358/450, 540, 1.1, 2.1, 3.23, 3.24, 1.18, 515, 358/518, 521, 522, 523, 2.99, 3.01, 3.02, 358/3.05, 3.06, 3.07, 3.09, 3.1, 3.11, 3.12, 358/3.2, 3.21, 3.22, 3.27, 1.11, 1.13, 1.15, 358/407, 468; 382/162, 164, 165, 167; 347/2, 347/3, 5, 14, 23, 24, 115, 172, 232; 399/1, 399/8, 28, 38, 39, 49, 46

See application file for complete search history.

(56) References Cited

U.S. PATENT DOCUMENTS 5,583,665 A * 12/1996 Gregory et al. ............. 358/504
5,612,903 A * 3/1997 Miller ......................... 355/35
6,021,196 A * 2/2000 Sandford et al. ............ 713/176
6,516,089 B1 * 2/2003 McCann et al. ............. 382/166
6,519,046 B1 * 2/2003 Kinjo .......................... 358/1.1
6,525,838 B1 * 2/2003 Nagae et al. ................ 358/3.01
6,539,863 B2 * 4/2003 Shiraishi ..................... 101/365
6,839,066 B2 * 1/2005 Muramoto ................... 345/589
6,943,915 B1 * 9/2005 Teraue ......................... 358/1.9

FOREIGN PATENT DOCUMENTS

| JP | 09-231353 A | 9/1997 |
|---|---|---|
| JP | 11-146182 A | 5/1999 |
| JP | 11-177834 A | 7/1999 |
| JP | 2000-004362 A | 1/2000 |

* cited by examiner

*Primary Examiner*—Dov Popovici
(74) *Attorney, Agent, or Firm*—Sughrue Mion, PLLC

(57) ABSTRACT

An image processing apparatus has a color conversion section for applying a predetermined color conversion processing to an input image data to generate color conversion image data, a patch data generating section for generating patch data representative of a color patch independently of at least part of color conversion processing of the color conversion processing in the color conversion section, a data synthesizing section for synthesizing the color conversion image data and the patch data 16 to generate output image data representative of an image in which an image represented by the color conversion image data 14 are synthesized with a color patch represented by the patch data, and a driver section for sending output image data to a color printer.

3 Claims, 15 Drawing Sheets

IMAGE PROCESSING APPARATUS AND IMAGE PROCESSING PROGRAM STORAGE MEDIUM

BACKGROUND OF THE INVENTION

1. Field of the Invention

The present invention relates to an image processing apparatus for applying image data to color conversion processing, and an image processing program storage medium storing an image processing program which causes a computer to operate as the image processing apparatus when the image processing program is incorporated into the computer.

2. Description of the Related Art

Hitherto, in a field of the color printing, in order to verify color reproduction characteristics in the event that a color image is printed by an actual large-scale of printing machine, there are widely used printers referred to as a color proofer.

However, color reproduction characteristics of the color proofers are different every color proofer. This variation in color reproduction characteristics is an obstacle to verification of color reproduction characteristics. Further, also in individual color proofers, it is difficult to avoid occurrence of variation in color reproduction characteristics according to change with elapse.

In view of the foregoing, there are proposed various methods of confirming variations in machine type and change with elapse among the color proofers. One of the methods there is a method in which patch data for confirmation is added to color image data to print-output a color patch for confirmation in a blank area of an area in which a color image is to be printed, so that a color of the color patch is measured by a measuring instrument.

However, this method is involved in such a problem that it is difficult for a small-scale of Design Company to possess the measuring instrument, because the measuring instrument is expensive.

As a method using no measuring instrument, there is a method of confirmation in which a reference patch for confirmation is prepared beforehand, and a confirming color patch, which is added to the blank of the image, is compared with the reference patch through eyes observation. However, in case of the color proofer, in order to predict colors of the final printed matter, there is a need to output on a switching basis a plurality of sorts of color conversion LUT (Look Up Table) in accordance with a difference of color reproduction characteristics due to a sort of printing sheets and the like. For this reason, there is a problem that a difference of the color conversion LUT may change a color of a color patch to be added to a blank of an image.

SUMMARY OF THE INVENTION

In view of the foregoing, it is an object of the present invention to provide an image processing apparatus suitable for creating a proof including a color patch which is easy to confirm variations in machine type and change with elapse among color proofers, and an image processing program storage medium storing an image processing program which causes a computer to operate as the image processing apparatus when the image processing program is incorporated into the computer.

To achieve the above-mentioned object, the present invention provides a first image processing apparatus for applying a color conversion processing to input image data to generate output image data, said image processing apparatus comprising:

a color conversion section for applying a predetermined color conversion processing to input image data to generate color conversion image data;

a patch data generating section for generating patch data representative of a color patch independently of at least part of color conversion processing of the color conversion processing in said color conversion section; and a data synthesizing section for synthesizing the color conversion image data with the patch data to generate output image data representative of an image in which an image represented by the color conversion image data is synthesized with the color patch represented by the patch data.

According to the first image processing apparatus, there is provided the patch data generating section for generating patch data representative of a color patch independently of at least part of color conversion processing of the color conversion processing in said color conversion section. While a color conversion processing is applied to the input image data in accordance with the color conversion LUT selected from among a plurality of sorts of color conversion LUTs to generate output image data, the color conversion processing is not applied basically to the confirming patch data to be appended to generate output image data. This feature makes it possible to always perform a color accuracy confirmation by a common color patch, even if the color conversion section performs the color conversion processing through changing over a plurality of sorts of color conversion LUTs. Thus, it is possible to exactly confirm variations in machine type and change with elapse among the color proofers.

In the image processing apparatus according to the present invention as mentioned above, it is acceptable that said image processing apparatus generates output image data representative of an image in which the color patch is appended to a proof outputted by a proofer for outputting a proof of an image outputted by a predetermined target device for outputting an image, said color conversion section performs the color conversion processing in accordance with a color conversion definition including a first color conversion definition reflecting a profile of the predetermined target device and a second color conversion definition reflecting a profile of the proofer, and said patch data generating section generates the patch data independently of both the first color conversion definition and the second color conversion definition.

According to the image processing apparatus according to the present invention as mentioned above, the patch data generating section generates the patch data independently of both the color conversion definition of the target device and the color conversion definition of the proofer. This feature makes it possible to always perform a color accuracy confirmation by a common color patch. Thus, it is possible to exactly confirm variations in machine type and change with elapse among the color proofers.

In the image processing apparatus according to the present invention as mentioned above, it is acceptable that said color conversion section performs the color conversion processing in accordance with a color conversion definition including the first color conversion definition and the second color conversion definition, and in addition a third color conversion definition for a correcting use, and said patch data generating section generates the patch data independently of both the first color conversion definition and the second color conversion definition, and the third color conversion definition as well.

According to the image processing apparatus according to the present invention as mentioned above, the patch data generating section generates the patch data independently of both the first color conversion definition and the second color conversion definition, and the third color conversion definition as well. This feature makes it possible to exactly confirm variations in machine type and change with elapse among the color proofers.

In the image processing apparatus according to the present invention as mentioned above, it is acceptable that said color conversion section performs the color conversion processing in accordance with a color conversion definition including the first color conversion definition and the second color conversion definition, and in addition a third color conversion definition for a correcting use, and said patch data generating section generates the patch data independently of both the first color conversion definition and the second color conversion definition, but generates the patch data by performing a color conversion processing according to the third color conversion definition.

According to the image processing apparatus according to the present invention as mentioned above, said patch data generating section generates the patch data independently of both the first color conversion definition and the second color conversion definition, but generates the patch data by performing a color conversion processing according to the third color conversion definition. This feature makes it possible to exactly confirm as to whether variations in machine type and change with elapse among the color proofers are exactly corrected.

To achieve the above-mentioned object, the present invention provides a first image processing program storage medium storing an image processing program which causes a computer to operate as an image processing apparatus for applying a color conversion processing to input image data to generate output image data, when said image processing program is incorporated into the computer and is executed, said image processing program comprising:

a color conversion section for applying a predetermined color conversion processing to input image data to generate color conversion image data;

a patch data generating section for generating patch data representative of a color patch independently of at least part of color conversion processing of the color conversion processing in said color conversion section; and a data synthesizing section for synthesizing the color conversion image data with the patch data to generate output image data representative of an image in which an image represented by the color conversion image data is synthesized with the color patch represented by the patch data.

According to the image processing program stored in the first image processing program storage medium, there is provided the patch data generating section for generating patch data representative of a color patch independently of at least part of color conversion processing of the color conversion processing in said color conversion section. While a color conversion processing is applied to the input image data in accordance with the color conversion LUT selected from among a plurality of sorts of color conversion LUTs to generate output image data, the color conversion processing is not applied basically to the confirming patch data to be appended to generate output image data. This feature makes it possible to always perform a color accuracy confirmation by a common color patch, even if the color conversion section performs the color conversion processing through changing over a plurality of sorts of color conversion LUTs. Thus, it is possible to exactly confirm variations in machine type and change with elapse among the color proofers.

In the image processing program storage medium according to the present invention as mentioned above, it is acceptable that said image processing program causes the computer to operate as an image processing apparatus for generating output image data representative of an image in which the color patch is appended to a proof outputted by a proofer for outputting a proof of an image outputted by a predetermined target device for outputting an image, said color conversion section performs the color conversion processing in accordance with a color conversion definition including a first color conversion definition reflecting a profile of the predetermined target device and a second color conversion definition reflecting a profile of the proofer, and said patch data generating section generates the patch data independently of both the first color conversion definition and the second color conversion definition.

According to the image processing program storage medium according to the present invention as mentioned above, the patch data generating section generates the patch data independently of both the color conversion definition of the target device and the color conversion definition of the proofer. This feature makes it possible to always perform a color accuracy confirmation by a common color patch. Thus, it is possible to readily provide on a desired computer an image processing apparatus capable of exactly confirming variations in machine type and change with elapse among the color proofers.

In the image processing program storage medium according to the present invention as mentioned above, it is acceptable that said color conversion section performs the color conversion processing in accordance with a color conversion definition including the first color conversion definition and the second color conversion definition, and in addition a third color conversion definition for a correcting use, and said patch data generating section generates the patch data independently of both the first color conversion definition and the second color conversion definition, and the third color conversion definition as well.

According to the image processing program storage medium according to the present invention as mentioned above, the patch data generating section generates the patch data independently of both the first color conversion definition and the second color conversion definition, and the third color conversion definition as well. This feature makes it possible to readily provide on a desired computer an image processing apparatus capable of exactly confirming variations in machine type and change with elapse among the color proofers.

In the image processing program storage medium according to the present invention as mentioned above, it is acceptable that said color conversion section performs the color conversion processing in accordance with a color conversion definition including the first color conversion definition and the second color conversion definition, and in addition a third color conversion definition for a correcting use, and said patch data generating section generates the patch data independently of both the first color conversion definition and the second color conversion definition, but generates the patch data by performing a color conversion processing according to the third color conversion definition.

According to the image processing program storage medium according to the present invention as mentioned above, said patch data generating section generates the patch data independently of both the first color conversion definition and the second color conversion definition, but generates the patch data by performing a color conversion processing according to the third color conversion definition. This feature makes it possible to readily provide on a desired computer an image processing apparatus capable of exactly confirm as to whether variations in machine type and change with elapse among the color proofers are exactly corrected.

According to the first image processing apparatus or the image processing program stored in the first image processing program storage medium of the present invention as mentioned above, it is possible to avoid such an inconvenience that a difference in a plurality of sorts of color conversion LUTs prepared would make a change of colors of a color patch on an image owing to circumstances of the printing machine side such as differences in sort of printing sheets to be used in the printing machine.

However, an alternation of the sheets is not restricted to the printing sheets used in the printing machine, it happens that the color proofer side also prints out a color image through the selection of a sheet from among a plurality of sorts of sheets, such as a glossy sheet, a semi-glossy sheet and a newspaper color sheet, in accordance with a sort of a printing sheet. Thus, in the event that the color proofer side also adopts a plurality of sorts of sheets, there is a possibility that a color of the confirming color patch varies in accordance with a sort of a sheet at the color proofer side, even if there is adopted a scheme in which a color patch free from the color conversion is appended to a color image after the color conversion.

In order to solve this problem, it is acceptable that color patch data is prepared for each sort of the sheet to be used in a color proofer, and color patch data is changed over in accordance with a sort of a sheet to be used in a print output by a color proofer. However, in that case, a management of the color patch data is complicated and there is a need to provide a large capacity of memory to store the color patch data.

In view of the foregoing, an object of the present invention is to provide an image processing apparatus (a second image processing apparatus of the present invention) wherein only one sort of patch data is prepared regardless of the sort of sheets of the proofer, for performing a color conversion capable of outputting the same color of color patch for various sorts of sheet, and an image processing program storage medium (a second image processing program storage medium of the present invention) storing an image processing program which causes a computer to operate as such an image processing apparatus.

To achieve the above-mentioned object of the present invention, the present invention provides a second image processing apparatus for applying a color conversion processing to image data, said image processing apparatus comprising:

an image data conversion section for converting first image data in which a color is defined with coordinate values on a target device color space into second image data in which a color is defined with coordinate values on a proofer color space in accordance with both a first color conversion definition defining an association between coordinates on the target device color space depending on a predetermined target device outputting an image and coordinates on a predetermined colorimetric color space, said first color conversion definition being representative of color reproduction characteristic of the predetermined target device, and a second color conversion definition defining an association between coordinates on the proofer color space depending on a proofer outputting a proof image of an image outputted from the target device and coordinates on the predetermined colorimetric color space, said second color conversion definition being representative of color reproduction characteristic of the proofer; and a patch data conversion section for converting first patch data in which a color is defined by coordinates on the colorimetric color space into second patch data in which a color is defined by coordinates on the proofer color space in accordance with the second color conversion definition.

According to the second image processing apparatus according to the present invention as mentioned above, regarding the proof image to be printed out using a proofer, the color conversion is performed in accordance with both the first color conversion definition, said first color conversion definition being representative of color reproduction characteristic of the predetermined target device, and the second color conversion definition, said second color conversion definition being representative of color reproduction characteristic of the proofer, and regarding the color patch, the color conversion is performed in accordance with the second color conversion definition. When a plurality of sorts of sheet is used for the proofer, the second color conversion definition is created for each sort of sheet. Accordingly, performing the color conversion according to the second color conversion definition on the color patch makes it possible to output a color patch of a color independent of a sheet of the proofer, even if there is prepared only one sort of color patch data.

In the second image processing apparatus according to the present invention as mentioned above, it is acceptable that said image processing apparatus further comprises a patch data generating section for generating first patch data in which a color is defined by coordinates on the colorimetric color space, and said patch data conversion section converts the first patch data generated by said patch data generating section into the second patch data in which a color is defined by coordinates on the proofer color space.

While it is acceptable that the first patch data is inputted each time from the exterior, a provision of the patch data generating section may avoid the necessity for an input of the first patch data each time from the exterior, since the first patch data is fixed in coordinates on the colorimetric color space when the first patch data is determined once. It is acceptable that the patch data generating section generates the first patch data by reading the stored patch data, or alternatively it is acceptable that the patch data generating section generates the first patch data by arithmetic operation. Any one is acceptable, as the patch data generating section, which generates the patch data.

In the second image processing apparatus according to the present invention as mentioned above, it is preferable that said second image processing apparatus further comprises a data synthesizing section for synthesizing the second image data obtained by said image data conversion section with the second patch data obtained by said patch data conversion section to generate synthesized image data in which a color is represented by coordinates on the proofer color space, said synthesized image data being representative of an image in which an image represented by the second image data is synthesized with the color patch represented by the second patch data.

According to the second image processing apparatus as mentioned above, there is provided the data synthesizing section as mentioned above. When a proofer generates a color image in accordance with the synthesized image data generated by the data synthesizing section, it is possible to know a state of the proofer just a time when the proofer prints out a proof image, through comparison of the confirming color patch on the color image with the reference patch.

Further, to perform the synthesis of data for appending a color patch to a color image (a proof image) to be printed out, it is not always needed to perform the synthesis on data in which a color is represented by coordinates on the proofer color space, as mentioned above, and it is acceptable to provide an arrangement set forth below.

That is, the present invention provides a second image processing apparatus for applying a color conversion processing to image data, said image processing apparatus comprising:

a first image data conversion section for converting first image data in which a color is represented with coordinate values on a target device color space depending on a predetermined target device outputting an image into second image data in which a color is defined with coordinate values on a predetermined colorimetric color space in accordance with a first color conversion definition defining an association between coordinates on the target device color space and coordinates on the predetermined colorimetric color space, said first color conversion definition being representative of color reproduction characteristic of the predetermined target device;

a data synthesizing section for synthesizing the second image data obtained by said first image data conversion section with patch data in which a color is defined by coordinates on the predetermined colorimetric color space to generate first synthesized image data in which a color is represented by coordinates on the colorimetric color space, said first synthesized image data being representative of an image in which an image represented by the second image data is synthesized with the color patch represented by the patch data; and a second image data conversion section for converting the first synthesized image data generated by said data synthesizing section into second synthesized image data in which a color is defined with coordinate values on a proofer color space in accordance with a second color conversion definition defining an association between coordinates on the proofer color space depending on a proofer outputting a proof image of an image outputted from the target device and coordinates on the predetermined colorimetric color space, said second color conversion definition being representative of color reproduction characteristic of the proofer.

As mentioned above, to synthesize the image data with the patch data, it is acceptable that the synthesis is performed on the colorimetric color space, and the second color conversion definition is used to convert it into data on the proofer color space.

In the second image processing apparatus according to the present invention as mentioned above, it is preferable that said image processing apparatus further comprises a patch data generating section for generating patch data in which a color is defined by coordinates on the colorimetric color space, and said data synthesizing section synthesizes the second image data obtained by said first image data conversion section with the patch data generated by the patch data generating section.

This feature makes it possible to generate the patch data inside and avoid the necessity for inputting the patch data each time from the exterior.

To achieve the above-mentioned object, the present invention provides a second image processing program storage medium storing an image processing program which causes a computer to operate as an image processing apparatus for applying a color conversion processing to input image data to generate output image data, when said image processing program is incorporated into the computer and is executed, said image processing program comprising:

an image data conversion section for converting first image data in which a color is defined with coordinate values on a target device color space into second image data in which a color is defined with coordinate values on a proofer color space in accordance with both a first color conversion definition defining an association between coordinates on the target device color space depending on a predetermined target device outputting an image and coordinates on a predetermined colorimetric color space, said first color conversion definition being representative of color reproduction characteristic of the predetermined target device, and a second color conversion definition defining an association between coordinates on the proofer color space depending on a proofer outputting a proof image of an image outputted from the target device and coordinates on the predetermined colorimetric color space, said second color conversion definition being representative of color reproduction characteristic of the proofer; and a patch data conversion section for converting first patch data in which a color is defined by coordinates on the colorimetric color space into second patch data in which a color is defined by coordinates on the proofer color space in accordance with the second color conversion definition.

In the second image processing program storage medium according to the present invention as mentioned above, it is acceptable that said image processing program stored in the second image processing program storage medium further comprises a patch data generating section for generating first patch data in which a color is defined by coordinates on the colorimetric color space, and said patch data conversion section converts the first patch data generated by said patch data generating section into the second patch data in which a color is defined by coordinates on the proofer color space.

In the second image processing program storage medium according to the present invention as mentioned above, it is preferable that said image processing program further comprises a data synthesizing section for synthesizing the second image data obtained by said image data conversion section with the second patch data obtained by said patch data conversion section to generate synthesized image data in which a color is represented by coordinates on the proofer color space, said synthesized image data being representative of an image in which an image represented by the second image data is synthesized with the color patch represented by the second patch data.

Alternatively, in order that a proofer outputs a color image with a color patch, the present invention provides a second image processing program storage medium storing an image processing program which causes a computer to operate as an image processing apparatus for applying a color conversion processing to input image data to generate output image data, when said image processing program is incorporated into the computer and is executed, said image processing program comprising:

a first image data conversion section for converting first image data in which a color is represented with coordinate values on a target device color space depending on a predetermined target device outputting an image into second image data in which a color is defined with coordinate values on a predetermined colorimetric color space in accordance with a first color conversion definition defining an association between coordinates on the target device color space and coordinates on the predetermined colorimetric color space, said first color conversion definition being representative of color reproduction characteristic of the predetermined target device;

a data synthesizing section for synthesizing the second image data obtained by said first image data conversion section with patch data in which a color is defined by coordinates on the predetermined colorimetric color space to generate first synthesized image data in which a color is represented by coordinates on the colorimetric color space, said first synthesized image data being representative of an image in which an image represented by the second image data is synthesized with the color patch represented by the patch data; and a second image data conversion section for converting the first synthesized image data generated by said data synthesizing section into second synthesized image data in which a color is defined with coordinate values on a proofer color space in accordance with a second color conversion definition defining an association between coordinates on the proofer color space depending on a proofer outputting a proof image of an image outputted from the target device and coordinates on the predetermined colorimetric color space, said second color conversion definition being representative of color reproduction characteristic of the proofer.

In this case, it is acceptable that said image processing program further comprises a patch data generating section for generating patch data in which a color is defined by coordinates on the colorimetric color space, and said data synthesizing section synthesizes the second image data obtained by said first image data conversion section with the patch data generated by the patch data generating section.

When the image processing program stored in the second image processing program storage medium is installed in a computer and is executed, it is possible to cause the computer to operate as the second image processing apparatus.

DETAILED DESCRIPTION OF PREFERRED EMBODIMENTS

Embodiments of the present invention will be described with reference to the accompanying drawings.

Here first, there will be explained a hardware structure of a computer system in which an image processing program according to an embodiment of the present invention is installed so that the computer system is used as an image processing apparatus according to an embodiment of the present invention.

Figure 1:
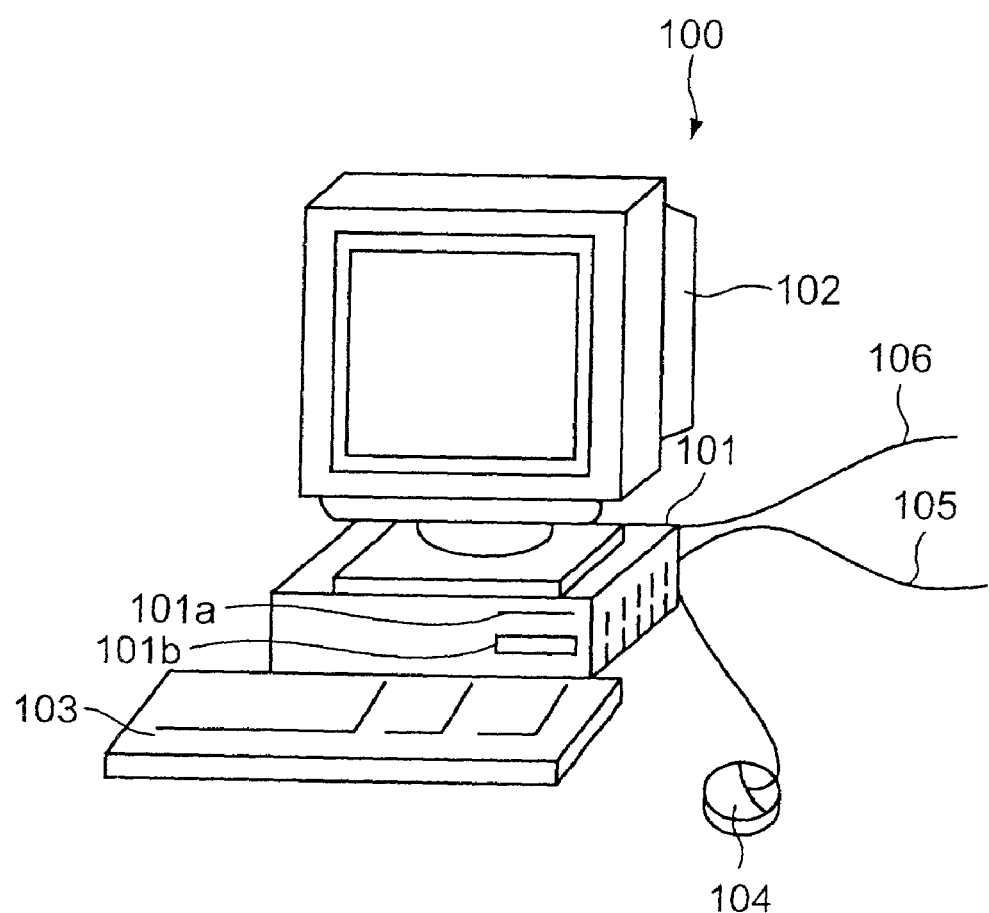
FIG. 1 is a perspective view of a computer system used as an image processing apparatus according to an embodiment of the present invention.

FIG. 1 is a perspective view of a computer system used as an image processing apparatus according to an embodiment of the present invention.

As shown in FIG. 1, a computer 100 comprises a main frame unit 101 incorporating therein a CPU (central processing unit), memories (RAM, ROM), a hard disk, etc., a CRT display 102 for displaying an image on a display screen in accordance with an instruction from the main frame unit 101, a keyboard 103 for inputting various sorts of information, such as an user's instruction and character information, to the main frame unit 101 in accordance with a key operation, a mouse 104 for inputting an instruction according to, for example, an icon and the like, through designation of an optional position on the display screen of the CRT display 102, the icon and the like being displayed on the position on the display screen, a cable 105 connecting the computer with a printer used as a proofer, and a communication cable 106 for connecting the computer to a communication line such as an internet or a LAN (local area network).

The main frame unit 101 has a flexible disk (FD) mounting slot 101a for mounting a flexible disk (FD), and a CD-ROM mounting slot 101b for mounting a CD-ROM. The main frame unit 101 incorporates thereinto an FD drive for driving the FD mounted thereon and a CD-ROM drive for driving the CD-ROM 410 mounted thereon.

As the computer system 100, it is possible to use a computer system generally referred to as a workstation or a personal computer.

Figure 2:
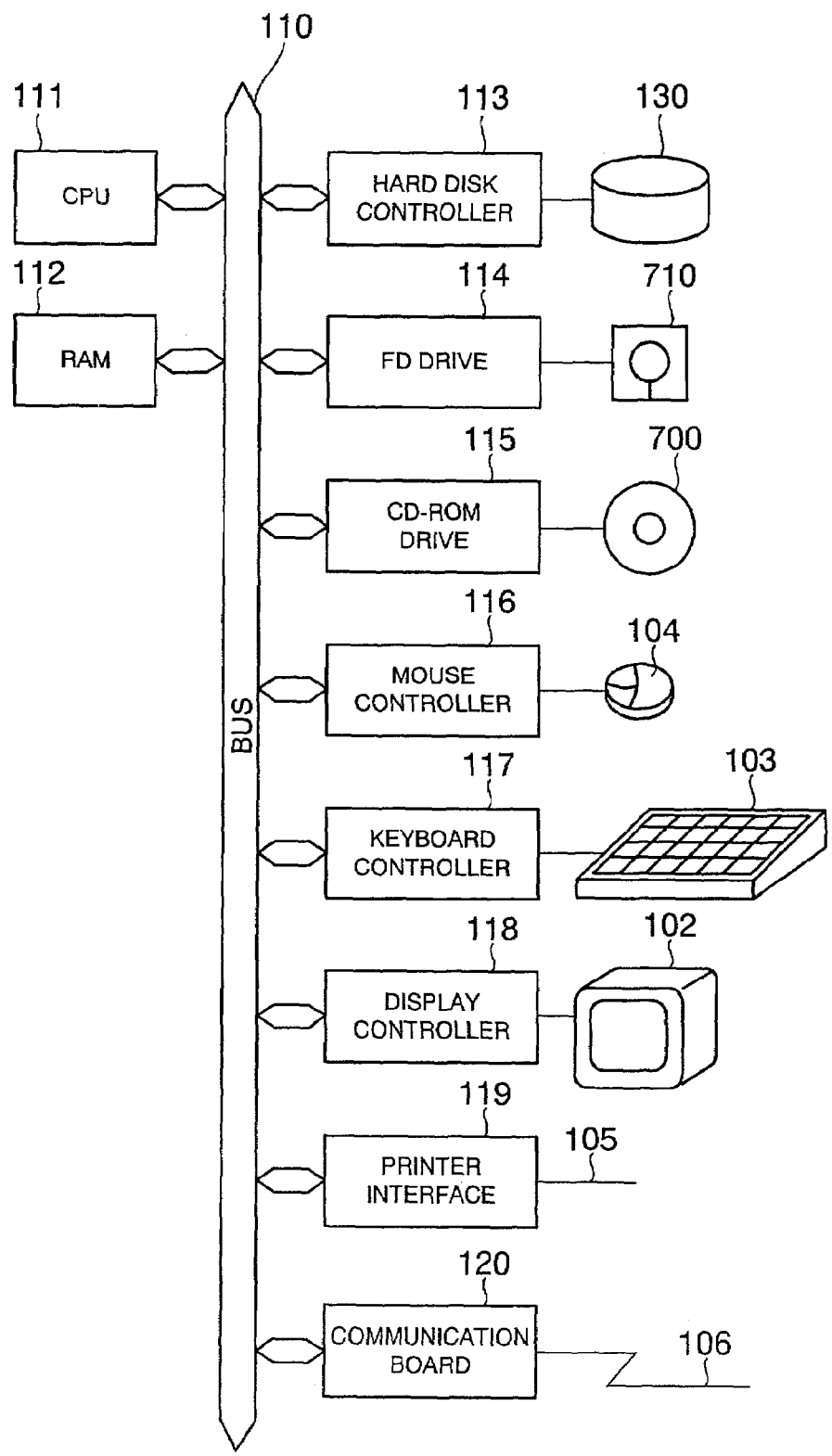
FIG. 2 is a hardware structural view of the computer system having the external appearance shown in FIG. 1.

FIG. 2 is a hardware structural view of the computer system having the external appearance shown in FIG. 1.

The hardware construction view of the computer system shows a CPU (central processing unit) 111, a RAM (random access memory) 112, a hard disk controller 113, a FD (floppy disk) drive 114, a CD-ROM drive 115, a mouse controller 116, a keyboard controller 117, a display controller 118, a printer interface 119, and a communicating board 120. Those are connected to one another through a bus 110.

Inside the floppy disk drive 114 and the CD-ROM drive 115, as described referring to FIG. 1, the floppy disk 710 and the CD-ROM 700 are loaded, respectively. The floppy disk drive 114 and the CD-ROM drive 115 access the floppy disk 710 and the CD-ROM 700 loaded, respectively. The printer interface is connected via the cable 105 to a printer (not illustrated) used as a proofer. The communicating board 120 is connected via the communication cable 106 to the communication line.

FIG. 2 further shows a hard disk 130 to be accessed by the hard disk controller 113, a mouse 104 to be controlled by the mouse controller 116, a keyboard 103 to be controlled by the keyboard controller 117, and a CRT display 102 to be controlled by the display controller 118.

When the CD-ROM 700, which is an image processing program storage medium of the present invention, is loaded onto the CD-ROM mounting slot 101b shown in FIG. 1 to install an image processing program stored in the CD-ROM 700, an image processing apparatus is constructed and is used.

Next, there will be explained various embodiments of the first image processing apparatus.

Figure 3:
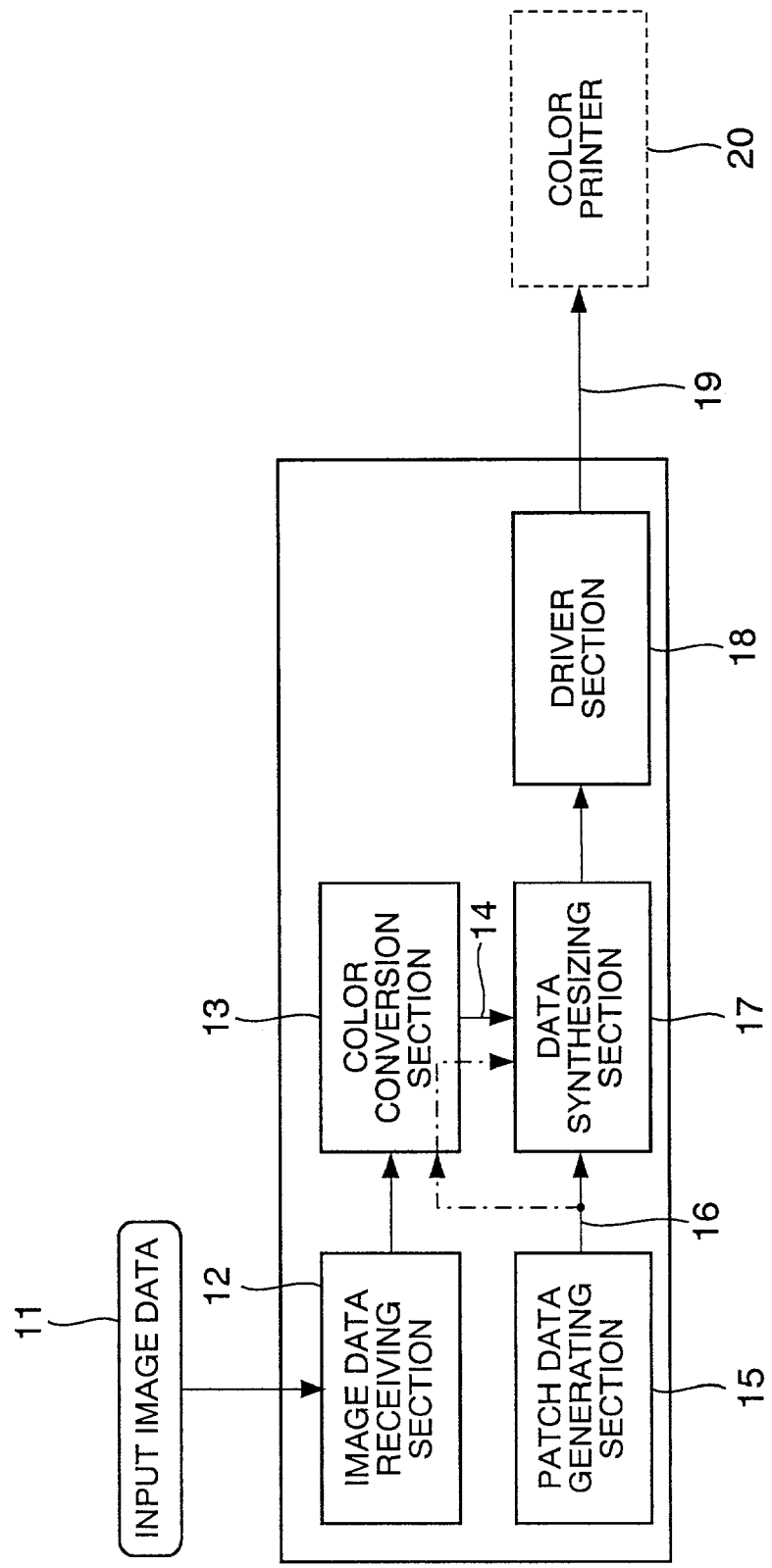
FIG. 3 is a schematic structural view of a first embodiment of a first image processing apparatus of the present invention.

FIG. 3 is a schematic structural view of a first embodiment of a first image processing apparatus of the present invention.

An image processing apparatus 10 shown in FIG. 3 applies a color conversion processing to received image data to create output image data 19. The output image data 19 is outputted, in form of image data representative of an image in which a color patch is appended to a proof, by a color printer 20 for outputting a proof for verification of an image to be outputted by a predetermined target device (printing machine and the like).

The image processing apparatus 10 comprises an image data receiving section 12 for receiving input image data 11, a color conversion section 13 for applying a predetermined color conversion processing to the input image data 11 to generate color conversion image data 14, a patch data generating section 15 for generating patch data 16 representative of a color patch independently of at least part of color conversion processing of the color conversion processing in the color conversion section 13, a data synthesizing section 17 for synthesizing the color conversion image data 14 and the patch data 16 to generate output image data 19 representative of an image in which an image represented by the color conversion image data 14 are synthesized with a color patch represented by the patch data 16, and a driver section 18 for sending output image data 19 to a color printer 20.

While the patch data 16 is fed directly to the data synthesizing section 17, there is another form in which the patch data 16 is fed to the color conversion section 13, as indicated with dashed line in FIG. 3, and is subjected to color conversion for correction for the color printer 20. Details will be described later.

The color printer 20 in the present embodiment corresponds to the proofer referred to in the present invention.

In the color printer 20, the color conversion section 13 performs the color conversion processing in accordance with a color conversion definition including a first color conversion definition reflecting a profile of the target device and a second color conversion definition reflecting a profile of the color printer 20. The patch data generating section 15 for generating the patch data independently of the first color conversion definition and the second color conversion definition.

Figure 4:
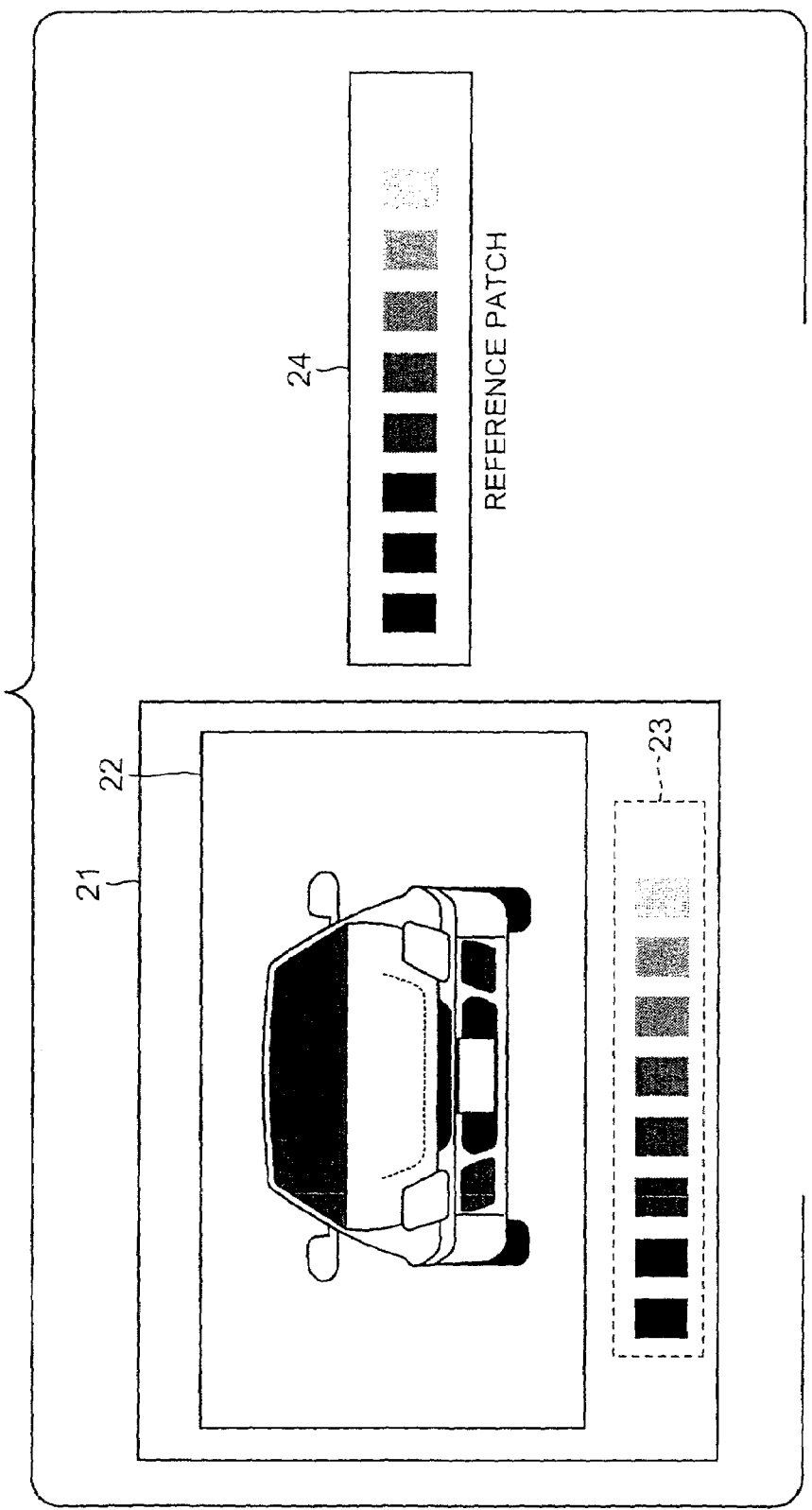
FIG. 4 is an example of an output image outputted from a color printer in accordance with output image data outputted from the image processing apparatus shown in FIG. 3.

FIG. 4 is an example of an output image outputted from a color printer in accordance with output image data outputted from the image processing apparatus shown in FIG. 3.

As shown in FIG. 4, an output image 21 consists of a proof image 22, which is a proof of an image outputted from a predetermined target device, and a color patch 23 appended to the proof image 22.

A comparison of the color patch 23 with a reference patch 24 for a reference, which is prepared beforehand, makes it possible to verify color reproduction characteristics of color image data in the above-mentioned predetermined target device.

According to the present embodiment, with respect to the color patch 23 and the reference patch 24, mixed gray of three colors of C (cyan), M (magenta) and Y (yellow) are regulated to tones of 9 grades.

Figure 5:
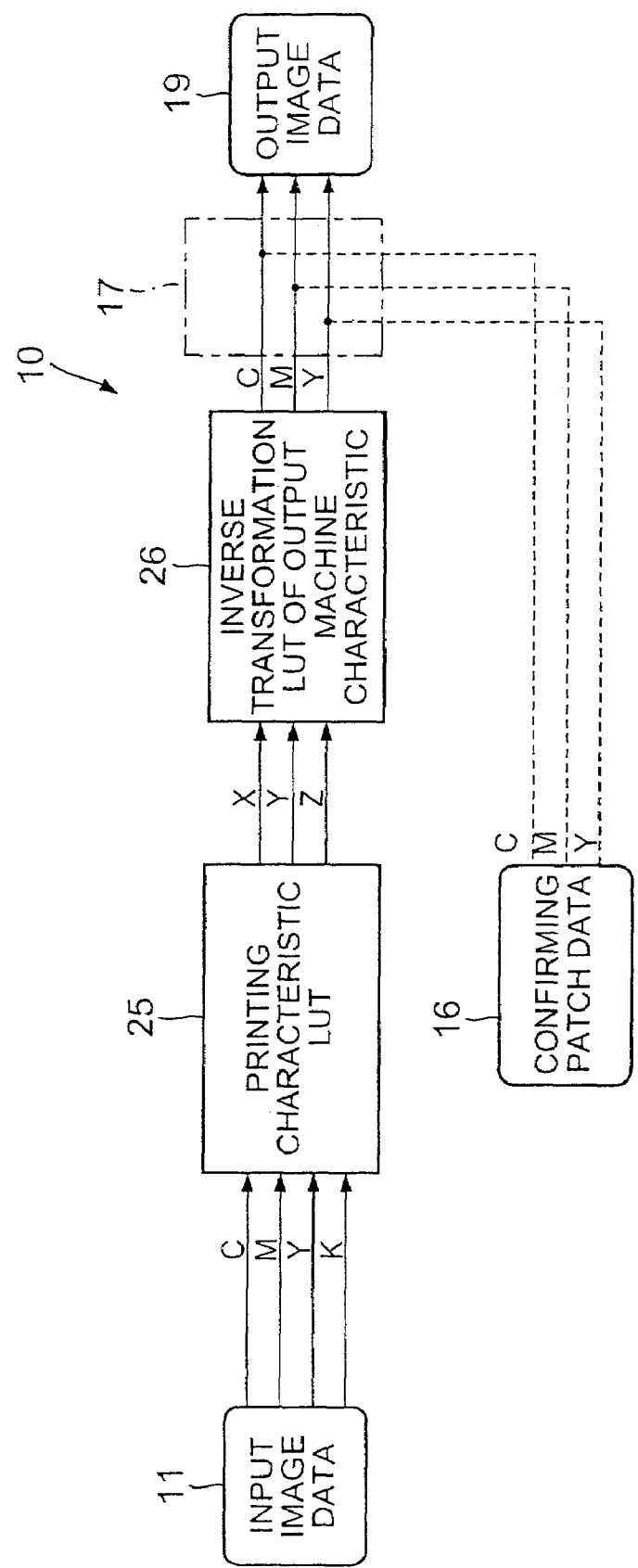
FIG. 5 is a flowchart useful for understanding the procedure of an image processing of the image processing apparatus shown in FIG. 3 in which output image data is generated from input image data.

FIG. 5 is a flowchart useful for understanding the procedure of an image processing of the image processing apparatus shown in FIG. 3 in which output image data is generated from input image data.

The image processing apparatus 10 shown in FIG. 3 performs a color conversion processing shown in FIG. 5 after the image data receiving section 12 receives image data. That is, input image data 11 consists of four colors of C (cyan), M (magenta), Y (yellow) and K (black), as shown in FIG. 5. The input image data 11 of CMYK four colors causes the color conversion section 13 (cf. FIG. 3) to perform a conversion from a CMYK color space to an XYZ color space in accordance with a printing characteristic LUT 25 describing a printing characteristic of a predetermined target device, that is, the first color conversion definition referred to in the present invention, and then to perform a conversion from the XYZ color space to the CMYK color space of the color printer 20 in accordance with an inverse transformation LUT 26 describing an inverse function of the printing characteristic of the printing characteristic of the color printer 20 (the proofer), that is, the second color conversion definition referred to in the present invention. Actually, however, there is prepared a LUT in which the printing characteristic LUT 25 is combined with the inverse transformation LUT 26, and the combined LUT is used for the conversion.

The above-mentioned color conversion processing completes the color conversion in which a color of an image outputted from a predetermined target device is simulated by the color printer 20 (the proofer).

On the other hand, as the patch data 16 of the color patch for confirmation of variations in machine type and change with elapse among the color proofers, there is prepared beforehand CMY tone values capable of outputting colors which are the same as the colors of the reference patch 24 (cf. FIG. 4) for reference. The patch data generating section 15 (cf. FIG. 3) generates the patch data 16 independently of the color conversion processing in the color conversion section 13.

Next, the data synthesizing section 17 synthesizes the color conversion image data 14 with the patch data 16 to generate output image data 19 representative of an image in which an image represented by the color conversion image data 14 is synthesized with a color patch represented by the patch data 16.

The output image data 19 thus generated is outputted via the driver section 18 from the color printer 20. Thus, according to the image processing apparatus of the present embodiment, since the patch data is generated independently of both the color conversion definition of the target device and the color conversion definition of the proofer, it is possible to confirm variations in machine type and change with elapse among the color proofers. Further, according to the image processing apparatus of the present embodiment, since the color patch is simultaneously outputted on the same sheet as the image represented by the color conversion image data 14, that is, the proof image, it is possible to know a state of the color printer in just a timing that the proof image is outputted. Further, it is possible to know the extent of fading of the proof image after the lapse of a little time.

Next, there will be explained a second embodiment of the first image processing apparatus of the present invention.

It happens that as the color space of the proofer, there is used a color space of R (red), G (green) and B (blue) other than the CMY color space. While the above-mentioned embodiment shows an example in which the CMY color space is used, next, as the second embodiment, there will be explained an example in which a color printer of three colors of R, G and B is used, as the color space of the proofer.

Figure 6:
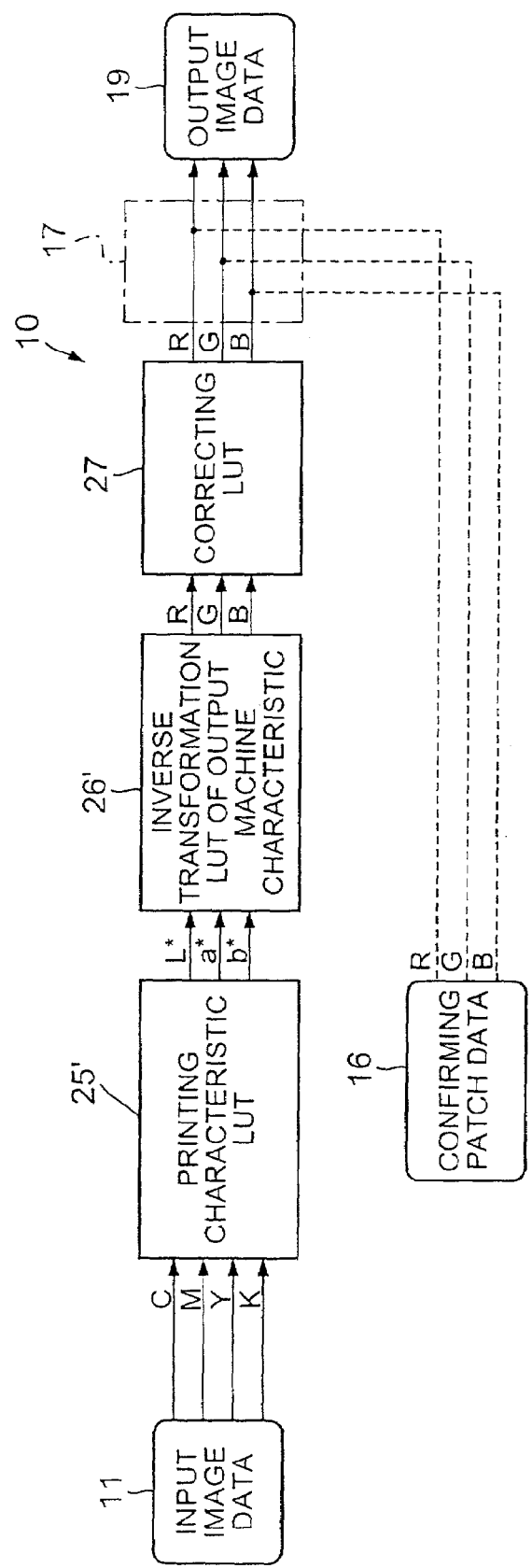
FIG. 6 is a flowchart useful for understanding the procedure of an image processing of a second embodiment of the first image processing apparatus of the present invention.

FIG. 6 is a flowchart useful for understanding the procedure of an image processing of a second embodiment of the first image processing apparatus of the present invention.

According to the second embodiment, the color conversion section 13 (cf. FIG. 3) performs a color conversion processing according to the color conversion definition including a correcting LUT 27, that is, the third color conversion definition referred to in the present invention, as well as a printing characteristic LUT 25' and an inverse transformation LUT 26'.

While the printing characteristic LUT 25 and the inverse transformation LUT 26 in the embodiment shown in FIG. 5 are the look up tables defining the conversions between the CMYK color space and the XYZ color space, and the XYZ color space and the CMYK color space, the printing characteristic LUT 25' and the inverse transformation LUT 26' in the embodiment shown in FIG. 6 are the look up tables defining the conversions between the CMYK color space and a L*a*b* color space, and the L*a*b* color space and a RGB color space, respectively. The correcting LUT 27 shown in FIG. 6 is a look up table for a fine adjustment in the event that characteristic of the color printer is slightly varied, and is also a one-dimensional look up table in which three colors of R, G and B are independently slightly adjusted. In the actual color conversion, there is created a single LUT in which the printing characteristic LUT 25', the inverse transformation LUT 26' and the correcting LUT 27 are united, and the color conversion is performed in accordance with the united single LUT.

According to the embodiment shown in FIG. 6, the patch data generated by the patch data generating section 15 (cf. FIG. 3) is defined with the RGB color space.

Further, according to the embodiment shown in FIG. 6, the patch data is generated independently of the printing characteristic LUT 25' (the first color conversion definition) and the inverse transformation LUT 26' (the second color conversion definition) of the output machine, and the correcting LUT 27 (the third color conversion definition) as well, and thus it is possible to exactly confirm variations in machine type and change with elapse among the color proofers.

Next, there will be explained a third embodiment of the first image processing apparatus of the present invention.

Figure 7:
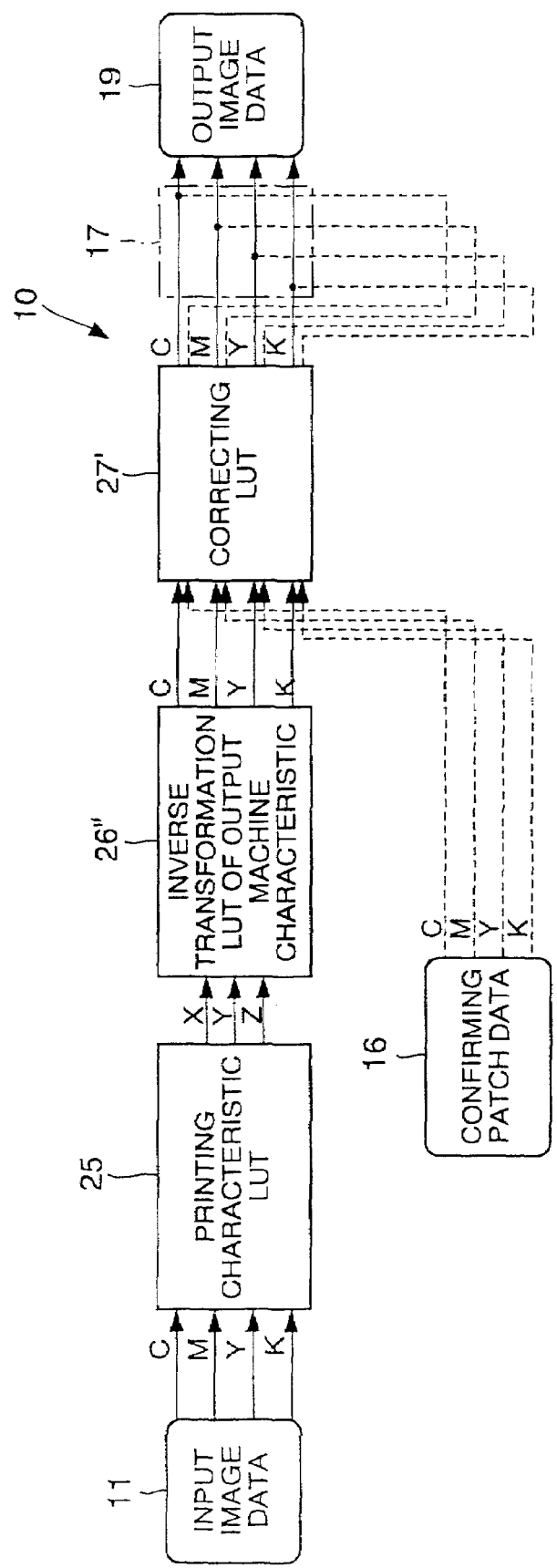
FIG. 7 is a flowchart useful for understanding the procedure of an image processing of a third embodiment of the first image processing apparatus of the present invention.

FIG. 7 is a flowchart useful for understanding the procedure of an image processing of a third embodiment of the first image processing apparatus of the present invention.

According to the third embodiment, there is adopted a proofer (a color printer) in which a proof image is outputted with inks of four colors of CMYK.

The color conversion section 13 (cf. FIG. 3) in the third embodiment performs, in a similar fashion to that of the color conversion section in the second embodiment shown in FIG. 6, a color conversion processing according to the color conversion definition including the printing characteristic LUT 25', the inverse transformation LUT 26' of the output machine characteristic, and the correcting LUT 27.

According to the third embodiment shown in FIG. 7, the printing characteristic LUT 25 is the same as the printing characteristic LUT in the embodiment shown in FIG. 5, which defines the color conversion between the CMYK color space and the XYZ color space. An inverse transformation LUT 26" of the output machine characteristic in the embodiment shown in FIG. 7 is a look up table defining a color conversion between the XYZ color space and the CMYK color space. A correcting LUT 27' is a one-dimensional look up table for a fine adjustment for a color printer in which four colors of C, M, Y and K are independently slightly adjusted.

Further, according to the embodiment shown in FIG. 7, the confirming patch data generated by the patch data generating section (cf. FIG. 3) is defined in the CMYK color space. While the confirming patch data is independently of the printing characteristic LUT 25 and the inverse transformation LUT 26" of the output machine characteristic, the confirming patch data is fed to the color conversion section (cf. FIG. 3) so as to be subjected to the color conversion in accordance with the correcting LUT 27', so that the confirming patch data thus subjected to the color conversion is synthesized with the color conversion image data by the data synthesizing section 17. Therefore, in the third embodiment, one, in which an effect of the color conversion according to only the correcting LUT 27' is applied to the patch data generating section in FIG. 3, corresponds to the patch data generating section referred to in the present invention.

To perform the actual color conversion, as the color conversion use of input image data, the printing characteristic LUT 25 and the inverse transformation LUT 26" of the output machine characteristic, and the correcting LUT 27' are combined to create one LUT. The input image data is subjected to the color conversion according to the one LUT obtained by the combination to generate color conversion data. As to the confirming patch data, as mentioned above, the confirming patch data is subjected to the color conversion according to only the correcting LUT 27'.

According to the present embodiment, on an image outputted from the color printer, there is obtained a color patch subjected to the color conversion according to the correcting LUT 27', and thus it is possible to exactly confirm variations in machine type and change with elapse among the color proofers (color printers) after a fine adjustment.

According to the present embodiment, the confirming patch data consists of four colors of CMYK. It is acceptable that the confirming patch data consists of three colors of CMY.

Next, there will be explained an embodiment of a first image processing program storage medium of the present invention.

Figure 8:
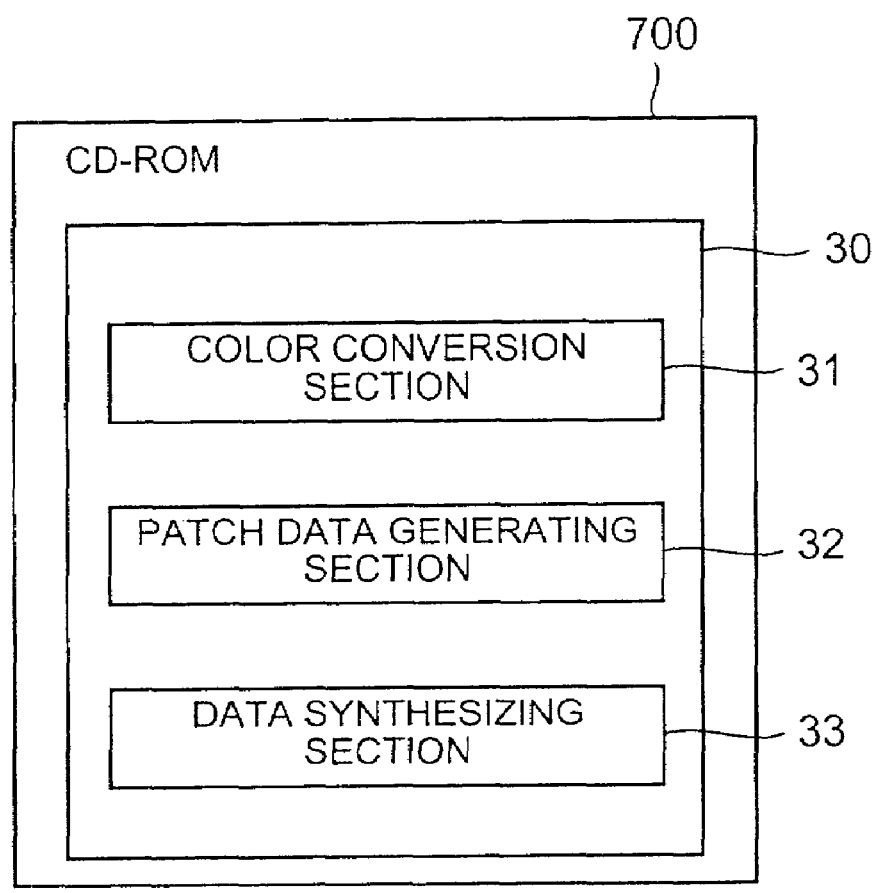
FIG. 8 is a schematic structural view of an image processing program stored in a first embodiment of a first image processing program storage medium of the present invention.

FIG. 8 is a schematic structural view of an image processing program stored in a first embodiment of a first image processing program storage medium of the present invention.

An image processing program 30 is stored in the CD-ROM 700 shown in FIG. 3. The image processing program 30 is a typical illustration of the various structures corresponding to the various embodiments of the above-mentioned image processing apparatus. When the image processing program 30 is installed in a computer and executed, the image processing program 30 causes the computer to operate as an image processing apparatus in which input image data is subjected to the color conversion processing and output image data is outputted. The image processing program 30 comprises a color conversion section 31, a patch data generating section 32, and a data synthesizing section 33.

The color conversion section 31 corresponds to the color conversion section 13 in FIG. 3, and applies a predetermined color conversion processing to the input image data 11 to generate the color conversion image data 14.

The patch data generating section 32 corresponds to the patch data generating section 15 in FIG. 3, and generates the patch data 16 representative of the color patch independently of at least part of color conversion processing of the color conversion processing in the color conversion processing section 13.

The data synthesizing section 33 corresponds to the data synthesizing section 17 in FIG. 3. When the color conversion image data 14 is synthesized with the patch data 16, the data synthesizing section 33 generates the output image data 19 representative of an image in which an image represented by the color conversion image data 14 is synthesized with an image represented by the patch data 16. The output image data 19 thus generated is outputted via the driver section 18 from the color printer 20. Thus, since the patch data is generated independently of both the color conversion definition of the target device and the color conversion definition of the proofer, it is possible to exactly confirm variations in machine type and change with elapse among the color proofers in accordance with the image processing program.

Next, there will be explained a second embodiment of a first image processing program storage medium of the present invention.

An image processing program stored in the image processing program storage medium of the second embodiment corresponds to the second embodiment of the above-mentioned image processing apparatus. According to this image processing program, the color conversion section 13 (cf. FIG. 3) performs the color conversion processing in accordance with a color conversion definition including the first color conversion definition and the second color conversion definition, and the third color conversion definition for correction as well, and as the color space of the proofer, it is possible to use a color printer of three colors of RGB.

In this manner, the patch data generating section (cf. FIG. 3) can generate the patch data independently of both the first color conversion definition and the second color conversion definition, and the third color conversion definition as well, and thus it is possible to exactly confirm variations in machine type and change with elapse among the color proofers.

Next, there will be explained a third embodiment of a first image processing program storage medium of the present invention.

An image processing program stored in the image processing program storage medium of the third embodiment corresponds to the third embodiment of the above-mentioned image processing apparatus. According to this image processing program, the color conversion section 13 (cf. FIG. 3) performs the color conversion processing in accordance with a color conversion definition including the first color conversion definition and the second color conversion definition, and the third color conversion definition for correction as well. The patch data generating section (cf. FIG. 3) generates the patch data independently of both the first color conversion definition and the second color conversion definition, and performs the color conversion processing in accordance with the third color conversion definition.

In this manner, it is possible to add K-monochromatic tone patch.

While FIG. 8 shows, as an embodiment of the first image processing program storage medium of the present invention, the CD-ROM 700 storing therein the image processing program 30, any one is acceptable, as the first image processing program storage medium of the present invention, which causes a computer to operate as the first image processing apparatus of the present invention. For example, a hard disk and the like, which constitute a computer in which an image processing program is installed, and store therein the image processing program, are also an example of the first image processing program storage medium of the present invention.

Next, there will be explained various embodiments of the second image processing apparatus of the present invention.

Figure 9:
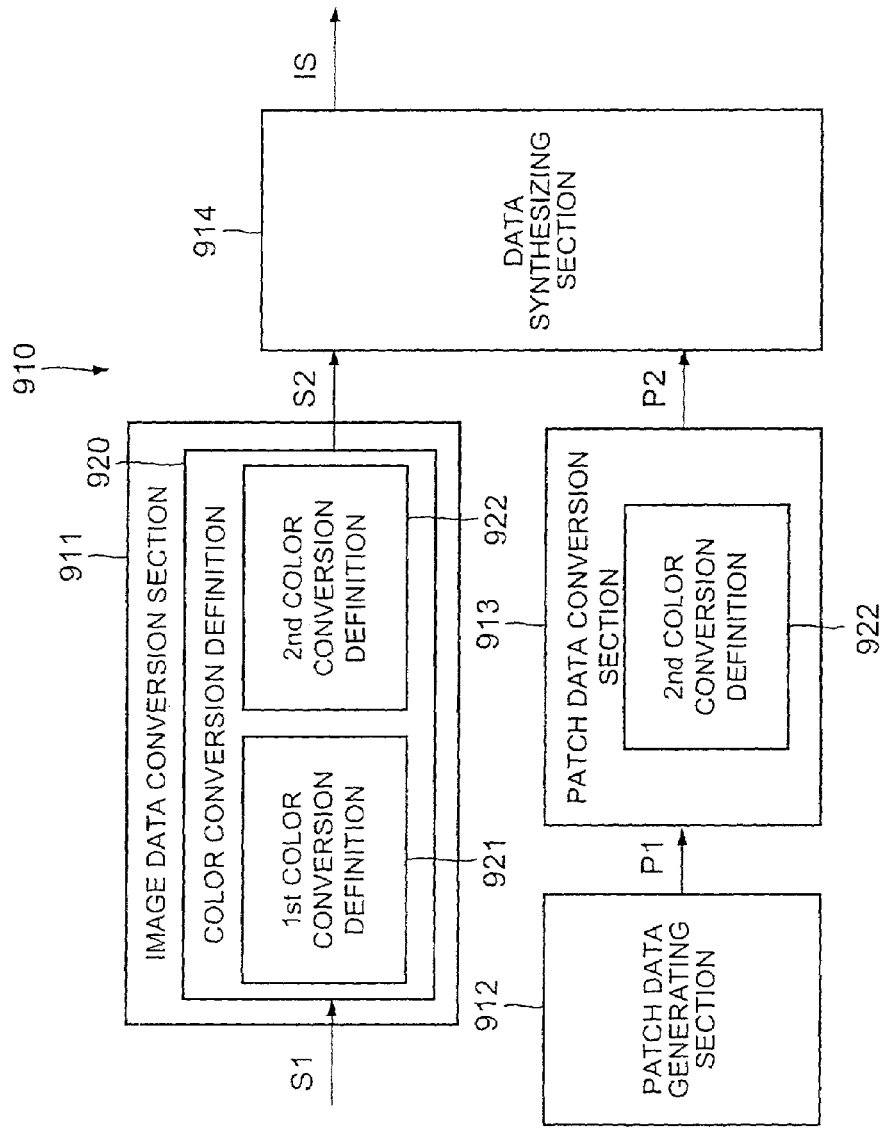
FIG. 9 is a schematic structural view of a first embodiment of a second image processing apparatus of the present invention.

FIG. 9 is a schematic structural view of a first embodiment of the second image processing apparatus of the present invention.

An image processing apparatus 910 applies the color conversion processing to image data, and comprises an image data conversion section 911, a patch data generating section 912, a patch data conversion section 913, and a data synthesizing section 914.

The image data conversion section 911 applies a color conversion processing according to a color conversion definition 920 to entered image data (first image data) S1 to generate second image data S2.

The color conversion definition 920 defines an association between coordinates on a color space (a CMYK color space for use of a printing machine) of four colors of C (cyan), M (magenta), Y (yellow) and K (black), which is suitable for printing by the printing machine (an example of the target device referred to in the present invention), and coordinates on a color space (a CMY color space for use of a printer) of, for example, three colors of C (cyan), M (magenta) and Y (yellow), which is suitable for printing output by the printer used as a proofer. The image data conversion section 911 receives first image data S1 in which a color is defined with coordinates of the CMYK color space for use of a printing machine, and converts first image data S1 into second image data S2 in which a color is defined with coordinates of the CMY color space for use of a printer, referring to the color conversion definition 920.

The color conversion definition 920 consists of a first color conversion definition 921 and a second color conversion definition 922.

The first color conversion definition 921 is representative of color reproduction characteristics of a printing machine and defines an association between coordinates on the CMYK color space for the use of a printing machine and coordinates on the XYZ color space (an example of the colorimetric color space referred to in the present invention). The first color conversion definition 921 is created one by one, when there exists a plurality of sorts of printing paper and ink for instance, even if the same printing machine is concerned, in accordance with the respective combination (printing condition) of those items.

The second color conversion definition 922 is representative of color reproduction characteristics of a printer used as the proofer referred to in the present invention, which print outs a proof image of an image obtained by printing of the printing machine, and defines an association between coordinates on the CMY color space for the use of a printer and coordinates on the XYZ color space (an example of the colorimetric color space referred to in the present invention). The second color conversion definition 922 is also created one by one, when there exists a plurality of sorts of printing paper and ink for instance, in accordance with the respective combination (printing condition) of those items.

When the image data conversion section 911 converts the first image data to the second image data, there are adopted the first color conversion definition according to the printing condition to be used in the printing machine of interest and the second color conversion definition according to the sort of sheet to be used for the print output in the printer of interest.

The image data conversion section 911 refers to the first color conversion definition 921 to convert the entered first image data S1, that is, image data in which a color is represented by coordinates on the CMYK color space for the printing machine use, into image data in which a color is represented by the XYZ color space, that is, the colorimetric color space, and then refers to the second color conversion definition 922 to convert the image data in which a color is represented by the XYZ color space, which is obtained through the conversion referring to the first color conversion definition 921, into the second image data S2 in which a color is represented by coordinates on the CMY color space for the printer use.

Alternatively, it is acceptable that the image data conversion section 911 first combines, as the equivalent color conversion to the above-mentioned color conversion, the first color conversion definition 922 with the second color conversion definition 922, to create a color conversion definition directly defining the association between coordinates on the CMYK color space for the printing machine use and coordinates on the CMY color space for the printer use, and converts the first image data S1 in which a color is defined by coordinates on the CMYK color space for the printing machine use into the second image data S2 in which a color is defined by coordinates on the CMY color space for the printer use, using the created color conversion definition.

The patch data generating section 912 generates first patch data P1 representative of a color patch, in which a color is defined in the XYZ color space. The patch data conversion section 913 applies the color conversion processing to the first patch data P1 generated by the patch data generating section 912. To apply the color conversion processing to the first patch data P1, the patch data conversion section 913 refers the second color conversion definition 922 representative of the color reproduction characteristic of the printer to convert the first patch data P1, that is, the patch data in which a color is defined by coordinates on the XYZ color space into the second patch data P2 in which a color is defined by coordinates on the CMY color space for a printer use.

As stated in the explanation of the color conversion definition 920 of the image data conversion section 911, the second color conversion definition 922 is created for each sort of sheets to be adopted in print output of a printer. Here, there is adopted the second color conversion definition according to the sort of sheet to be adopted now in print output. Accordingly, while the first patch data P1 before generated by the patch data generating section 912 is identical regardless of the sort of the sheets of the printer, the second patch data P2 after color-converted by the patch data conversion section 913 reflects the sort of sheet to be adopted in print output of a printer. Thus, when the print out is performed using the sort of sheet, the second patch data P2 is patch data capable of obtaining a color patch having an XYZ value represented by the first patch data P1 in which a color is defined within the XYZ color space.

The data synthesizing section 914 synthesizes the second image data S2 in which a color is defined by coordinates on the CMY color space for a printer use, which is generated by the color conversion in the image data conversion section 911, with the second patch data P2 in which a color is defined by coordinates on the CMY color space for the printer use, which is generated by the color conversion in the patch data conversion section 913, to generates synthesized image data IS in which a color is represented by coordinates on the CMY color space for the printer use, which represents an image in which an image represented by the second image data S2 is synthesized with a color patch represented by the second patch data P2.

The synthesized image data IS is transmitted to a printer. The printer outputs on a sheet the image based on the synthesized image data IS. The sheet used for the print out is a sheet of the sort associated with the second color conversion definition 922 now adopted.

The color patch (the confirming color patch) on the image thus printed out is compared with the reference patch.

Figure 10:
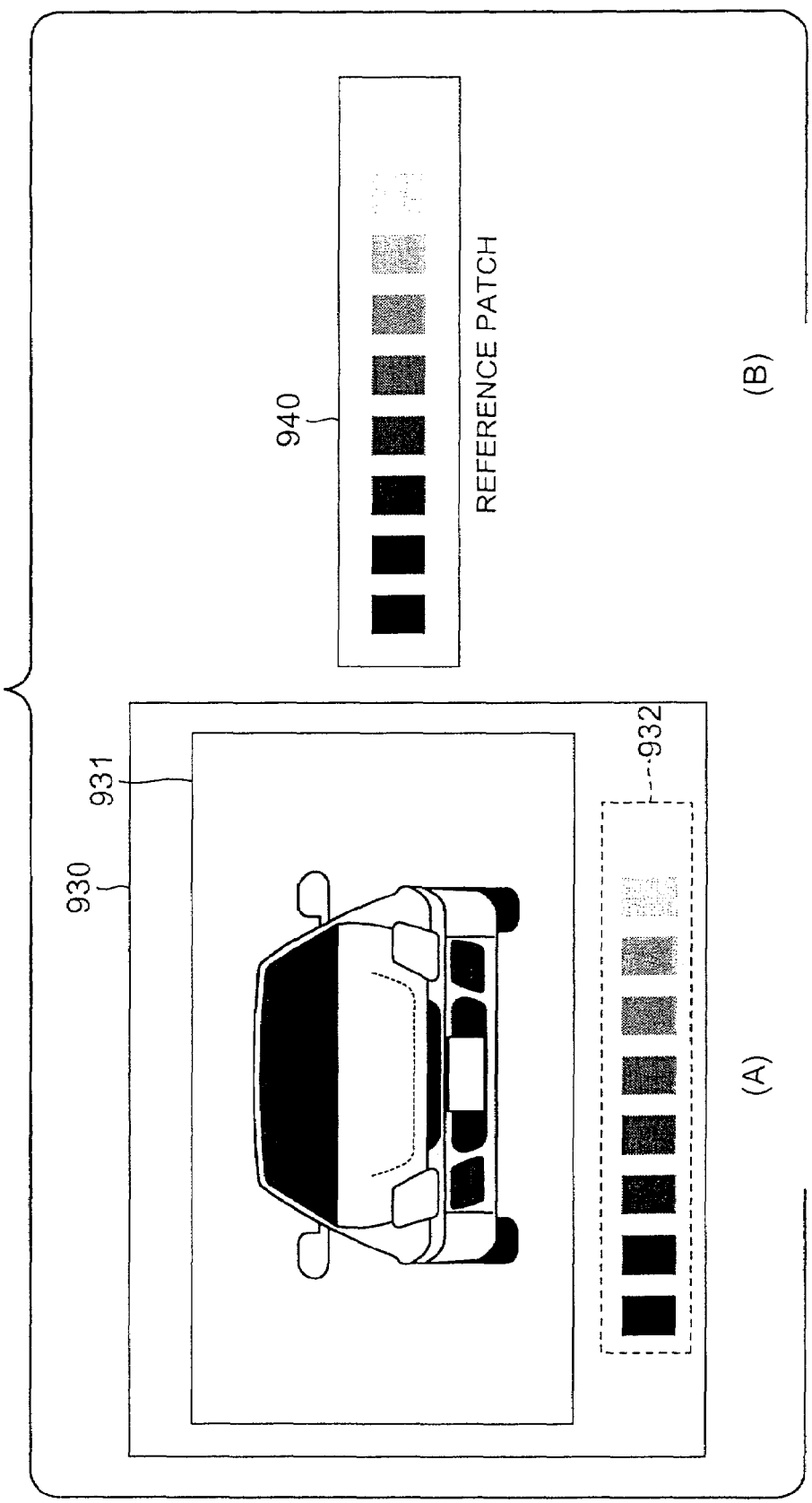
FIG. 10 is a view showing a printed out image (A) and a reference patch (B).

FIG. 10 is a view showing a printed out image (A) and a reference patch (B).

A part (A) of FIG. 10 shows an example of an image printed out in accordance with the synthesized image data IS. A confirming color patch 932 is printed out under a proof image 931 in which an image obtained through printing by the printing machine is simulated.

The confirming color patch 932 is printed out via the above-mentioned process. When the printer maintains the color reproduction characteristic of the second color conversion definition now adopted in the printer, the confirming color patch 932 is the same color patch as the reference patch 940 in colorimetry. Here, the confirming color patch 932 on the printed out sheet 930 is compared with the reference patch 940 through one's eyes, so that it is confirmed that characteristic of the printer is not varied. At that time, it is decided that the proof image 931 printed out on the sheet 930, which is the same sheet as the color patch 932, is a proof image having a proper color. On the other hand, when the confirming color patch 932 on the printed out sheet 930 is different from the reference patch 940, an adjustment of the printer is performed. This is not the subject of the present invention, and the details of the explanation are omitted.

Figure 11:
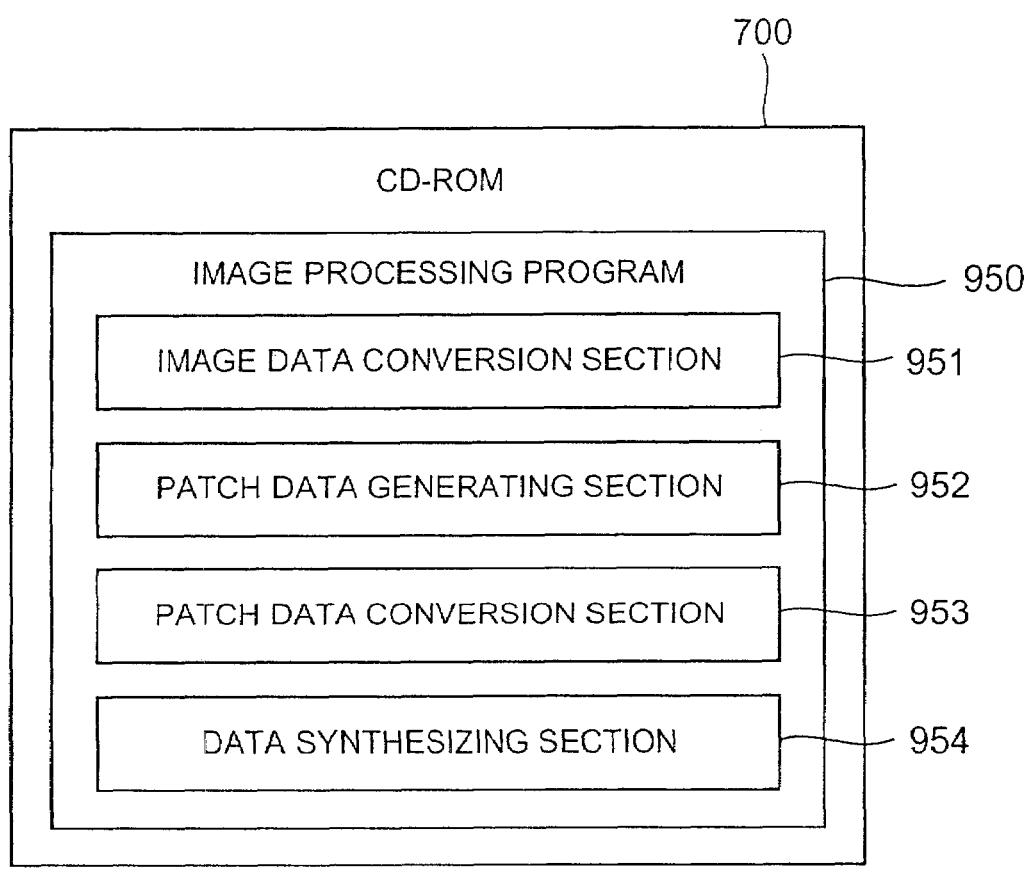
FIG. 11 is a schematic structural view of an image processing program stored in a first embodiment of a second image processing program storage medium of the present invention.

FIG. 11 is a schematic structural view of an image processing program stored in a first embodiment of a second image processing program storage medium of the present invention.

An image processing program 950 is stored in a CD-ROM 700. When the image processing program 950 is installed in the computer 100 shown in FIG. 1 and FIG. 2 and is executed, the computer 100 operates as the first embodiment of the second image processing apparatus of the present invention explained referring to FIG. 9.

The image processing program 950 comprises an image data conversion section 951, a patch data generating section 952, a patch data conversion section 953, and a data synthesizing section 954.

The image data conversion section 951, the patch data generating section 952, the patch data conversion section 953, and the data synthesizing section 954, which constitutes the image processing program 950 shown in FIG. 11, correspond to the image data conversion section 911, the patch data generating section 912, the patch data conversion section 913, and the data synthesizing section 914, which constitutes the image processing apparatus 910 shown in FIG. 9, respectively. The image data conversion section 911, the patch data generating section 912, the patch data conversion section 913, and the data synthesizing section 914, which constitutes the image processing apparatus 910 shown in FIG. 9, are constructed by a combination of a hardware and a software of the computer. On the other hand, the image data conversion section 951, the patch data generating section 952, the patch data conversion section 953, and the data synthesizing section 954, which constitutes the image processing program 950 shown in FIG. 11, are constructed by an application program of the hardware and the software of the computer. The effects of the image data conversion section 951, the patch data generating section 952, the patch data conversion section 953, and the data synthesizing section 954, when the image processing program 950 shown in FIG. 11 is installed in the computer and is executed, are the same as the effects of the image data conversion section 911, the patch data generating section 912, the patch data conversion section 913, and the data synthesizing section 914, which constitutes the image processing apparatus 910 shown in FIG. 9, respectively, and thus the redundant explanation will be omitted.

Figure 12:
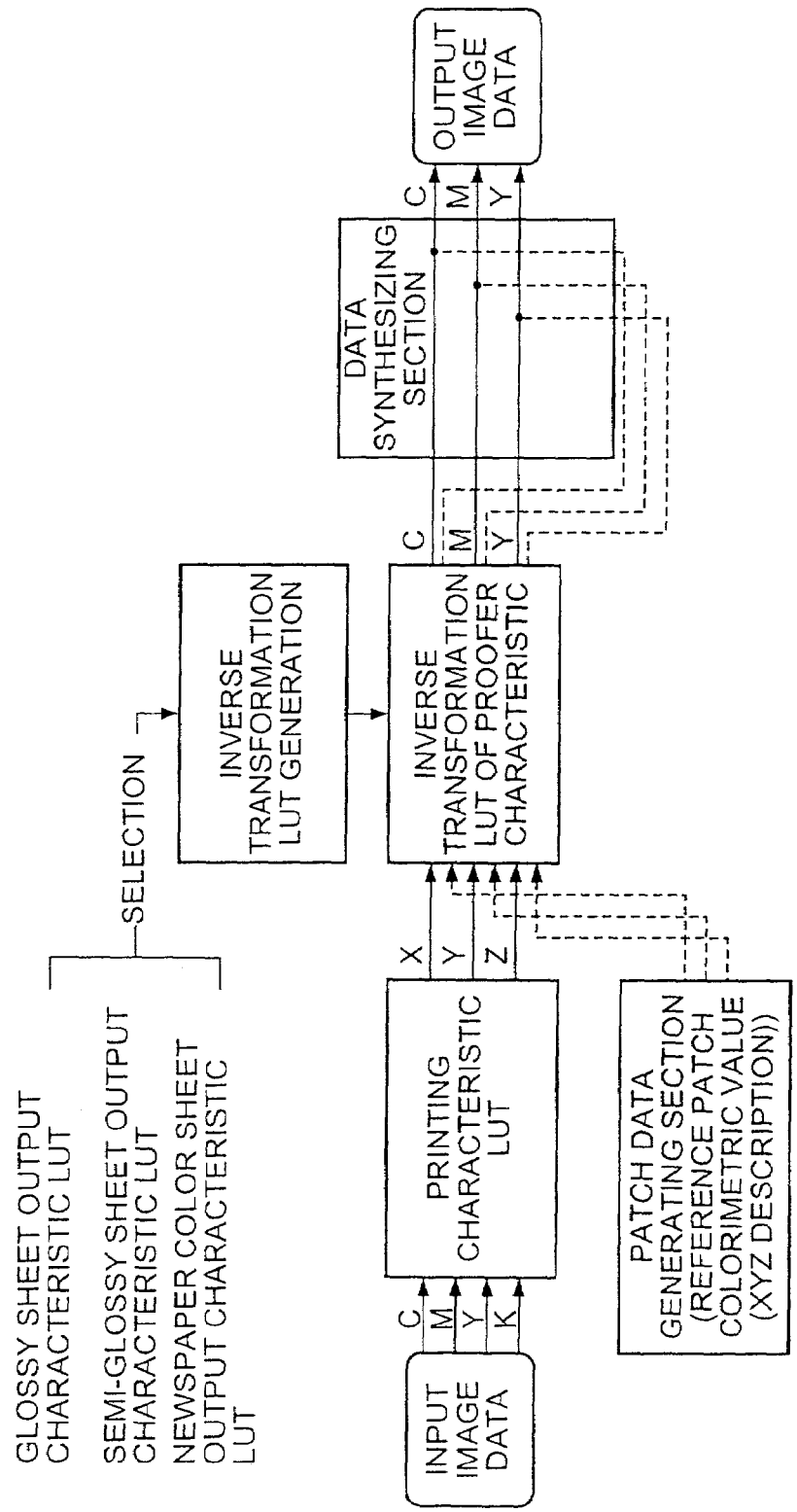
FIG. 12 is a typical illustration useful for understanding the procedure of an image processing by the image processing apparatus shown in FIG. 9.

FIG. 12 is a typical illustration useful for understanding the procedure of an image processing by the image processing apparatus shown in FIG. 9.

Input image data is an example of the first image data referred to in the present invention, and is represented by the CMYK for a printing machine use. This input image data is converted into image data represented by the XYZ referring to the print characteristic LUT (look up table) as an example of the first color conversion definition referred to in the present invention, which represents the color reproduction characteristic of the printing machine.

The image data represented by the XYZ is converted into image data (an example of the second image data referred to in the present invention) represented by the CMYK for a proofer (printer) use as an example of the second color conversion definition referred to in the present invention, which is representative of color reproduction characteristic of the proofer (printer).

According to the proofer (printer) used here, a sheet for print output use is selected from among a glossy sheet, a semi-glossy sheet and a newspaper color sheet, and there are prepared beforehand a glossy sheet output characteristic LUT representative of color reproduction characteristic when print output is performed on a glossy sheet, a semi-glossy sheet output characteristic LUT representative of color reproduction characteristic when print output is performed on a semi-glossy sheet, and a newspaper color sheet output characteristic LUT representative of color reproduction characteristic when print output is performed on a newspaper color sheet, and there is selected from among those LUTs the LUT associated with a sort of the sheet to be used for the printing output. The selected LUT converts coordinates of the CMY color space for a proofer (printer) use into coordinates of the XYZ color space. Here, there is selected an LUT according to a sort of a sheet to be printed out, and there is created from the selected LUT an inverse transformation LUT, that is, an LUT for converting coordinates on the XYZ color space into coordinates on the CMY color space for a proofer (printer) use. The inverse transformation LUT thus created is adopted as the inverse transformation LUT for the proofer characteristic shown in FIG. 6.

Here, as patch data representative of a color patch, there is used a colorimetric value (a colorimetric value represented by XYZ) of the reference patch obtained through measurement of the reference patch shown in the part (B) of FIG. 11 by a calorimeter. Here, in order to avoid necessity of every entry of a colorimetric value of the reference patch, the colorimetric value, which is once entered, is stored, and the stored colorimetric value is read by the patch data generating section so that the patch data is generated. Here, the patch data representative of the colorimetric value of the reference patch, which is generated through reading by the patch data generating section, is converted into patch data represented by the CMY color space for a proofer (printer) use referring to the inverse transformation LUT of proofer characteristic.

A data synthesizing section synthesizes the thus obtained image data represented by the CMY color space for a proofer (printer) use with the patch data represented by the same CMY color space, so that output image data representative of the synthesizing image as shown for example in the part (A) of FIG. 10 is generated. The output image data is transmitted to the proofer (printer) so that the image as shown for example in the part (A) of FIG. 10 is outputted.

Figure 13:
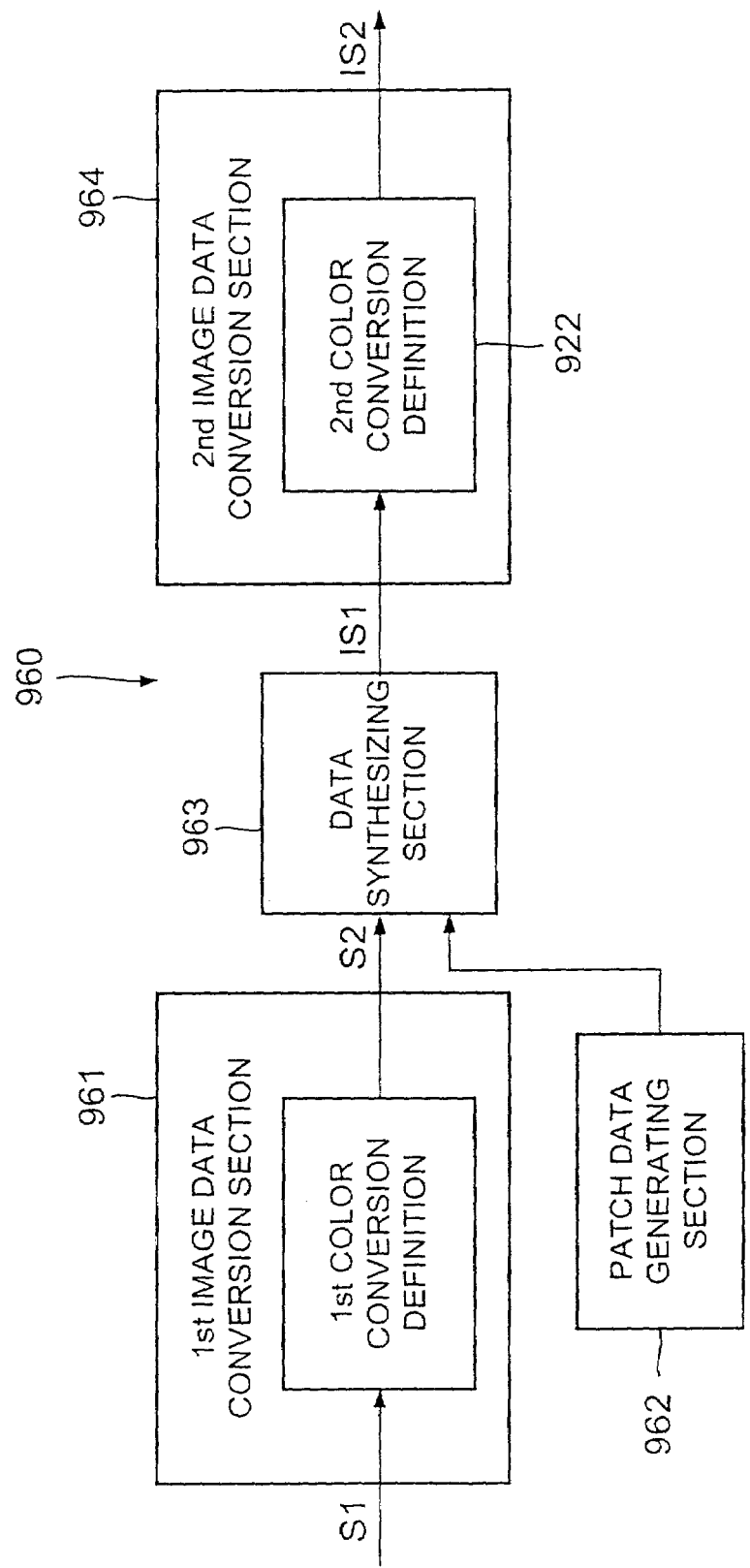
FIG. 13 is a schematic structural view of a second embodiment of the second image processing apparatus of the present invention.

FIG. 13 is a schematic structural view of a second embodiment of the second image processing apparatus of the present invention.

An image processing apparatus 960 of the second embodiment of the second image processing apparatus of the present invention shown in FIG. 13 also applies, in a similar fashion to that of the image processing apparatus 910, the color conversion processing to image data. The image processing apparatus 960 shown in FIG. 13 comprises a first image data conversion section 961, a patch data generating section 962, a data synthesizing section 963 and a second image data conversion section 964.

The first image data conversion section 961 receives first image data S1 in which a color is represented with coordinates on the CMYK color space for a printing machine use, and converts the first image data S1 into second image data S2 in which a color is represented with coordinates on the XYZ color space, in accordance with a first color conversion definition in which the association between the coordinates on the CMYK color space for a printing machine use and the coordinates on the XYZ color space as the colorimetric color space is defined, which is representative of the color reproduction characteristic of the printing machine. The second image data S2 is fed to the data synthesizing section 963.

In a similar fashion to that of the first embodiment of FIG. 9, the patch data generating section 962 generates patch data P in which a color is defined by coordinates on the XYZ color space, which is representative of a color patch. The patch data P is also fed to the data synthesizing section 963.

The data synthesizing section 963 synthesizes on the XYZ color space the second image data S2 with the patch data P to generate first synthesized image data IS1 in which a color is defined by coordinates on the XYZ color space. The first synthesized image data IS1 is image data representative of an image in which a color patch is added to a proof image, as shown in the part (A) of FIG. 10, in a similar fashion to that of the synthesized image data IS in the first embodiment of FIG. 9, on an image structure. But the first synthesized image data IS1 is one in which a color is defined by coordinates on the XYZ color space.

The first synthesized image data IS1 is fed to a second image data conversion section 964. The second image data conversion section 964 performs a color conversion in accordance with a second color conversion definition 922 defining the association between coordinates on the CMY color space for a printer use and coordinates on the XYZ color space is defined, which is representative of the color reproduction area of a printer used as a proofer. The second image data conversion section 964 converts the first synthesized image data IS1 into second synthesized image data IS2 in which a color is defined by coordinates on the CMY color space for a printer use.

The second synthesized image data IS2 is equivalent to the synthesized image data IS generated in the patch data conversion section 913 of the image processing apparatus 910 according to the first embodiment shown in FIG. 9.

It is acceptable that as shown in FIG. 13, synthesizing of the image data with the patch data is performed on the colorimetric color space (here the XYZ color space).

Figure 14:
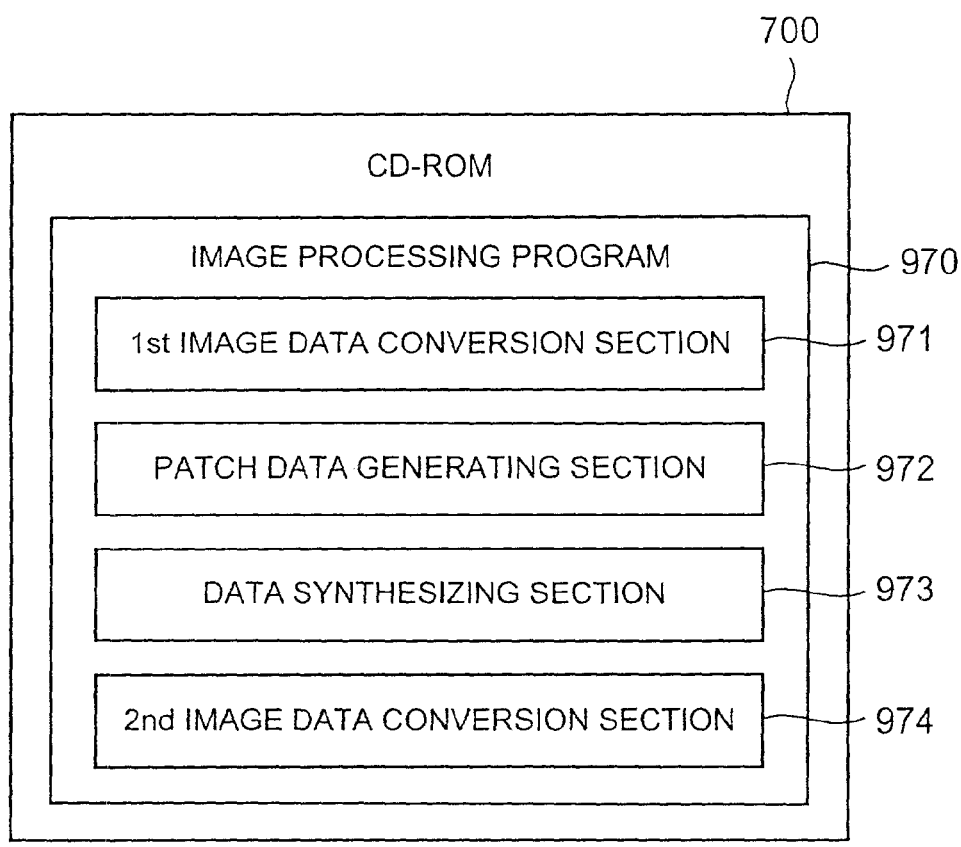
FIG. 14 is a schematic structural view of an image processing program stored in a second embodiment of the second image processing program storage medium of the present invention.

FIG. 14 is a schematic structural view of an image processing program stored in a second embodiment of the second image processing program storage medium of the present invention.

An image processing program 970 shown in FIG. 14 stores therein, in a similar fashion to that of the first embodiment shown in FIG. 11, a CD-ROM 700. When the image processing program 970 is installed in the computer 100 shown in FIG. 1 and FIG. 2 and is executed, the computer 100 is serves as the second embodiment of the second image processing apparatus of the present invention explained referring to FIG. 13.

The image processing program 970 comprises a first image data conversion section 971, a patch data generating section 972, a data synthesizing section 973 and a second image data conversion section 974.

The first image data conversion section 971, the patch data generating section 972, the data synthesizing section 973, and the second image data conversion section 974, which constitutes the image processing program 970 shown in FIG. 14, correspond to the first image data conversion section 961, the patch data generating section 962, the data synthesizing section 963, and the second image data conversion section 964, which constitutes the image processing apparatus 960 shown in FIG. 13, respectively. The first image data conversion section 961, the patch data generating section 962, the data synthesizing section 963, and the second image data conversion section 964, which constitutes the image processing apparatus 960 shown in FIG. 13, are constructed by a combination of a hardware and a software of the computer. On the other hand, the first image data conversion section 971, the patch data generating section 972, the data synthesizing section 973, and the second image data conversion section 974, which constitutes the image processing program 970 shown in FIG. 14, are constructed by an application program of the hardware and the software of the computer. The effects of the first image data conversion section 971, the patch data generating section 972, the data synthesizing section 973, and the second image data conversion section 974, when the image processing program 970 shown in FIG. 14 is installed in the computer and is executed, are the same as the effects of the first image data conversion section 961, the patch data generating section 962, the data synthesizing section 963, and the second image data conversion section 964, which constitutes the image processing apparatus 960 shown in FIG. 13, respectively, and thus the redundant explanation will be omitted.

Figure 15:
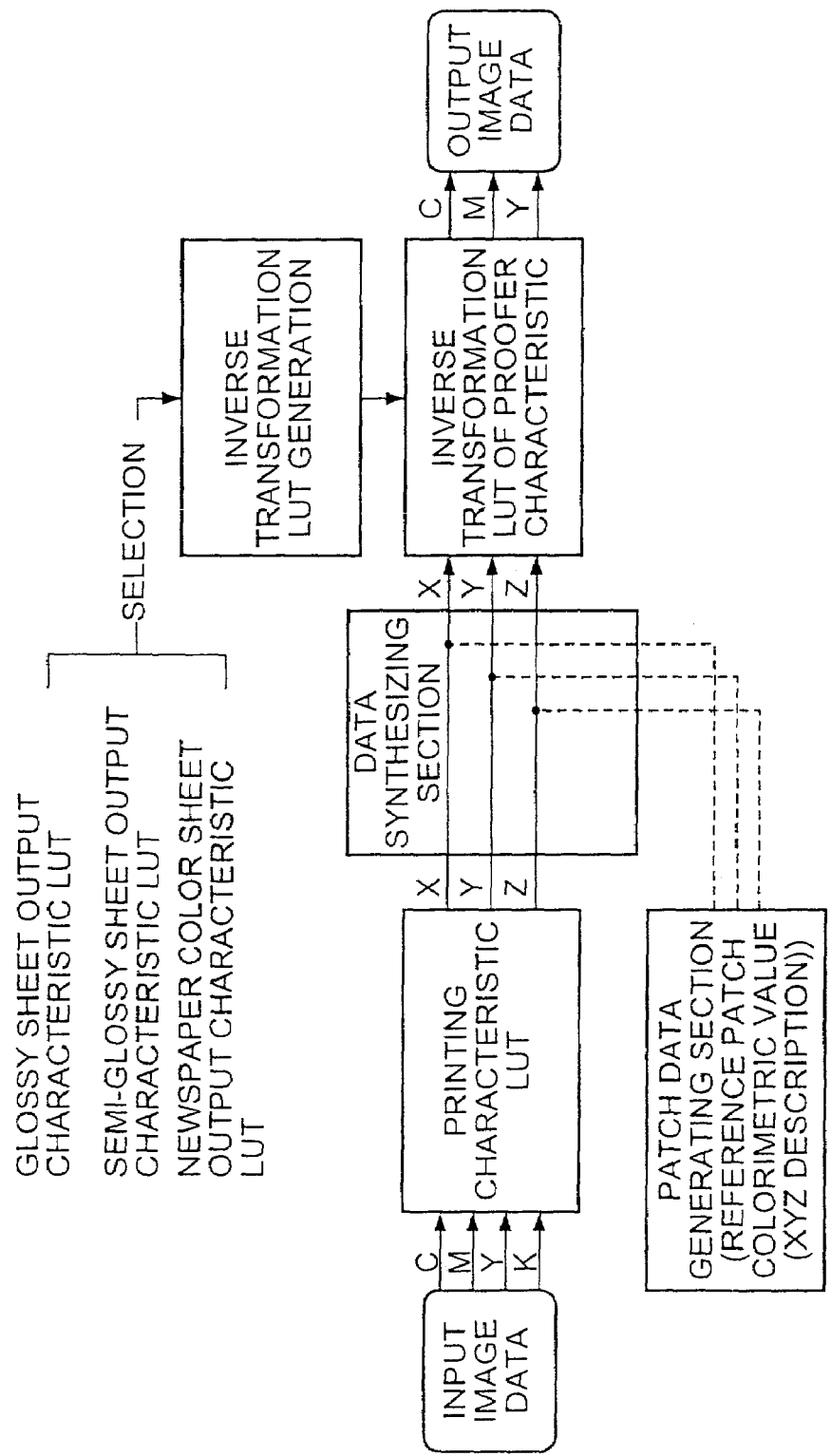
FIG. 15 is a typical illustration useful for understanding the procedure of an image processing by the image processing apparatus shown in FIG. 13.

FIG. 15 is a typical illustration useful for understanding the procedure of an image processing by the image processing apparatus shown in FIG. 13.

According to the typical illustration for the procedure of the image processing by the first embodiment shown in FIG. 12, the data synthesizing section is located after the inverse transformation LUT of the proofer characteristic. To the contrary, according to the typical illustration shown in FIG. 15, the data synthesizing section is located between the color conversion by the color reproduction characteristic LUT and the color conversion of the inverse transformation LUT of the proofer characteristic, and image data is synthesized with patch data on the XYZ color space. Other points are the same as FIG. 12 and thus redundant description will be omitted.

While all of the above-mentioned embodiments is concerned with an example in which image data defined by coordinates on the CMYK color space for a printing machine use is converted into image data defined by coordinates on the CMY color space for a printer use, the target device is not restricted to the printing machine and also the color space representative of the color reproduction characteristic of the target device is not restricted to the CMYK color space. Likely, also the color space of the proofer side is not restricted to the CMY color space and it is acceptable that the color space of the proofer side is the CMYK color space or the RGB color space.

Further, according to the above-mentioned embodiments, as the colorimetric color space, there is adopted the XYZ color space. However, it is acceptable that instead of the XYZ color space, for example, the L*a*b* color space and the like are adopted.

Furthermore, FIG. 11 and FIG. 14 show, as the embodiments of the second image processing program storage medium of the present invention, the CD-ROM 700 storing the image processing programs 950 and 970. However, any one is acceptable, as the second image processing program storage medium of the present invention, in a similar fashion to that of the first image processing program storage medium of the present invention, which stores an image processing program causing a computer to operate as the second image processing apparatus. For example, a hard disk and the like, which store therein an image processing program, constituting a computer in which the image processing program is installed, is an example of the second image processing program storage medium of the present invention.

As mentioned above, according to the image processing apparatus of the present invention, or the image processing program described in the image processing program storage medium of the present invention, it is possible to readily confirm variations in machine type and change with elapse among proofers.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing apparatus for applying a color conversion processing to input image data to generate output image data, the image processing apparatus comprising:

a color conversion section which applies a color conversion processing to input image data to generate color conversion image data;

a patch data generating section which generates a reference patch data showing a color spectrum representative of a color patch independent of the color conversion processing in the color conversion section and a color converted patch data by inputting the reference patch data into the color conversion section and applying the color conversion processing; and a data synthesizing section which synthesizes the color conversion image data with the reference patch data and the color converted patch data to generate output image data.

2. An image processing apparatus for applying a color conversion processing to image data, the image processing apparatus comprising:

an image data conversion section which converts first image data in which a color is defined with coordinate values on a target device color space into second image data in which a color is defined with coordinate values on a proofer color space; and a patch data generating section which generates first patch data, which shows a color spectrum representative of a color patch in which the color spectrum is defined by coordinates on a colorimetric color space, and a reference patch data which shows a color spectrum representative of a color patch data generated independently of a conversion within the image data conversion section;

a patch data conversion section which converts the first patch data into second patch data in which a color is defined by coordinates on the proofer color space in accordance with a second color conversion definition, a data synthesizing section which synthesizes the second image data with the second patch data and the reference patch data to generate synthesized image data.

3. An image processing apparatus according to claim 2, wherein the image data conversion section converts the first image data into the second image data in accordance with both a first color conversion definition which represents color reproduction characteristic of a target device and defines an association between coordinates on the target device color space depending on a target device outputting an image and coordinates on a predetermined colorimetric color space, and the second color conversion definition which represents color reproduction characteristic of a proofer and defines an association between coordinates on the proofer color space depending on a proofer outputting a proof image of an image outputted from the target device and coordinates on the predetermined colorimetric color space.

* * * * *